United States Patent
Liu et al.

(10) Patent No.: US 10,260,918 B2
(45) Date of Patent: Apr. 16, 2019

(54) FLOW AMOUNT MEASURING APPARATUS, MATERIAL MIXING SYSTEM AND NON TRANSITORY COMPUTER READABLE MEDIUM PERFORMING MATERIAL MIXING METHOD

(71) Applicant: PixArt Imaging Inc., Hsin-Chu (TW)

(72) Inventors: Feng-Chi Liu, Hsin-Chu (TW); Yen-Min Chang, Hsin-Chu (TW)

(73) Assignee: PixArt Imaging Inc., Hsin-Chu (TW)

(*) Notice: Subject to any disclaimer, the term of this patent is extended or adjusted under 35 U.S.C. 154(b) by 85 days.

(21) Appl. No.: 15/493,153

(22) Filed: Apr. 21, 2017

(65) Prior Publication Data

US 2018/0306612 A1    Oct. 25, 2018

(51) Int. Cl.
| | |
|---|---|
| *G01F 1/06* | (2006.01) |
| *G05D 7/06* | (2006.01) |
| *G01F 11/00* | (2006.01) |
| *G05D 11/00* | (2006.01) |

(52) U.S. Cl.
CPC ............ *G01F 1/065* (2013.01); *G01F 11/006* (2013.01); *G05D 7/0617* (2013.01); *G05D 11/00* (2013.01)

(58) Field of Classification Search
CPC ...... G05D 11/02; G05D 11/03; G05D 11/035; G05D 11/13; G05D 11/131; G05D 11/132; G05D 11/133; B67D 1/1202; B67D 1/1204; B67D 1/1211; B67D 1/1218; B67D 1/1234; G01F 1/065; G01F 1/07; G01F 1/10; G01F 1/103

USPC ..... 222/47–48, 135, 129.3, 129.4, 138, 139, 222/142; 73/861

See application file for complete search history.

(56) References Cited

U.S. PATENT DOCUMENTS

| | | | | |
|---|---|---|---|---|
| 2,670,756 | A * | 3/1954 | Granberg ............... | G05D 7/018 137/499 |
| 2,695,567 | A * | 11/1954 | Harvey ................. | B67D 1/105 222/209 |
| 2,698,111 | A * | 12/1954 | Wiley ..................... | G05D 7/018 222/20 |
| 3,138,217 | A * | 6/1964 | Bahr ........................ | B65B 1/18 141/83 |
| 3,902,201 | A * | 9/1975 | Bobo ........................ | E03D 1/32 137/119.07 |
| 4,172,381 | A * | 10/1979 | Aigner .................... | G01F 1/065 73/861.77 |
| 4,254,653 | A * | 3/1981 | Casey ................. | F02M 51/0678 73/1.26 |
| 4,440,030 | A * | 4/1984 | Pounder ................... | G01F 1/06 73/861.87 |
| 4,478,246 | A * | 10/1984 | Sherrod .................... | F17D 1/04 137/557 |

(Continued)

*Primary Examiner* — Paul R Durand
*Assistant Examiner* — Randall A Gruby
(74) *Attorney, Agent, or Firm* — Winston Hsu

(57) ABSTRACT

A flow amount measuring apparatus comprising: a rotating device, configured to rotate while material flows through the rotating device; a rotating bar, connected to the rotating device, configured to rotate corresponding to rotating of the rotating device; a feature acquiring device, configured to detect at least one feature of the rotating bar; and a computing unit, configured to compute a number for full rotations for the rotating bar based on the feature of the rotating bar, and configured to compute a flow amount for the material flows through the rotating device based on the number for full rotations.

18 Claims, 8 Drawing Sheets

(56) References Cited

U.S. PATENT DOCUMENTS

| | | | | |
|---|---|---|---|---|
| 5,868,279 | A  * | 2/1999 | Powell | B67D 1/0037 |
| | | | | 222/129.1 |
| 6,186,193 | B1 * | 2/2001 | Phallen | B65B 3/30 |
| | | | | 141/100 |
| 6,374,825 | B1 * | 4/2002 | Wallin | A61M 16/18 |
| | | | | 128/203.12 |
| 7,607,362 | B1 * | 10/2009 | Brost | G01F 1/06 |
| | | | | 73/202 |
| 2002/0044494 | A1 * | 4/2002 | Steinberger | B01F 3/088 |
| | | | | 366/152.1 |
| 2002/0060226 | A1 * | 5/2002 | Kameyama | B67D 1/0037 |
| | | | | 222/1 |
| 2004/0084475 | A1 * | 5/2004 | Bethuy | B67D 1/0032 |
| | | | | 222/1 |
| 2004/0165476 | A1 * | 8/2004 | Millan | G05D 11/133 |
| | | | | 366/152.2 |
| 2005/0058016 | A1 * | 3/2005 | Smith | G05D 11/132 |
| | | | | 366/152.1 |
| 2006/0144447 | A1 * | 7/2006 | Pittman | B01F 15/00155 |
| | | | | 137/565.29 |
| 2007/0057082 | A1 * | 3/2007 | McGloughlin | B05B 7/32 |
| | | | | 239/11 |
| 2007/0175511 | A1 * | 8/2007 | Doerr | G05D 11/132 |
| | | | | 137/6 |
| 2009/0037028 | A1 * | 2/2009 | Garcia | G05D 11/132 |
| | | | | 700/281 |
| 2012/0217192 | A1 * | 8/2012 | Blank | B01D 15/166 |
| | | | | 210/143 |
| 2014/0225745 | A1 * | 8/2014 | Lakhdari | G01F 1/06 |
| | | | | 340/870.02 |
| 2016/0109888 | A1 * | 4/2016 | Bordwell | B05B 7/04 |
| | | | | 137/3 |

* cited by examiner

FLOW AMOUNT MEASURING APPARATUS, MATERIAL MIXING SYSTEM AND NON TRANSITORY COMPUTER READABLE MEDIUM PERFORMING MATERIAL MIXING METHOD

BACKGROUND OF THE INVENTION

1. Field of the Invention

The present invention relates to a flow amount measuring apparatus, a material mixing system and a material mixing method, and particularly relates to a flow amount measuring apparatus, a material mixing system and a material mixing method which can automatically and precisely measure flow amount of material.

2. Description of the Prior Art

In daily life, people always need to mix different kinds of fluid to generate desired fluid. For example, people mix hot water and cold water to generate warm water. For another example, people mix paint with different colors to generate paint with a desired color.

However, people always need to manually measure the amount for different kinds of fluid to generate the mixed fluid. Such action always consumes a lot of time, and the composition for the mixed fluid is hard to be controlled.

SUMMARY OF THE INVENTION

Therefore, one objective of the present invention is to provide a flow amount measuring apparatus which can precisely measure the flow amount.

Another objective of the present invention is to provide a material mixing method and a material mixing system which can accurately provide desired mixing material.

One embodiment of the present invention discloses: a flow amount measuring apparatus, comprising: a rotating device, configured to rotate while material flows through the rotating device; a rotating bar, connected to the rotating device, configured to rotate corresponding to rotating of the rotating device; a feature acquiring device, configured to detect at least one feature of the rotating bar; and a computing unit, configured to compute a number for full rotations for the rotating bar based on the feature of the rotating bar, and configured to compute a flow amount for the material flows through the rotating device based on the number for full rotations.

Another embodiment of the present invention discloses: a material mixing system comprising a first material providing apparatus, a second material providing apparatus, a computing unit and a control unit. The first material providing apparatus comprises: a first rotating device, configured to rotate while first material flows through the first rotating device; a first rotating bar, connected to the first rotating device, configured to rotate corresponding to rotating of the first rotating device; and a first feature acquiring device, configured to acquire at least one feature of the first rotating bar. The second material providing apparatus comprises: a second rotating device, configured to rotate while second material flows through the second rotating device; a second rotating bar, connected to the second rotating device, configured to rotate corresponding to rotating of the second rotating device; and a second feature acquiring device, configured to acquire at least one feature of the second rotating bar. The computing unit is configured to compute a first number for full rotations for the first rotating bar based on the feature of the first rotating bar, configured to compute a second number for full rotations for the second rotating bar based on the feature of the second rotating bar, configured to compute first flow amount according to the first number, and configured to compute second flow amount according to the second number. The control unit is configured to control the first material to flow through the first rotating device or to stop based on the first flow amount, and configured to control the second material to flow through the second rotating device or to stop based on the second flow amount.

A material mixing method can be acquired based on the material mixing system. The description thereof is omitted for brevity here.

In view of above-mentioned embodiments, the flow amount of material can be automatically and precisely measured, thus the user can easily acquire a desired amount of material. Additionally, the user can easily acquire desired mixing material since the flow amount for different material can be automatically and precisely measured.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Please note the device, apparatus, module or any other component illustrated in following embodiments can be implemented by hardware (ex. circuit) or hardware with software (ex. a program installed to a processor). Additionally, the components illustrated in following embodiments can be separate to more components or integrated to fewer components.

Figure 1:
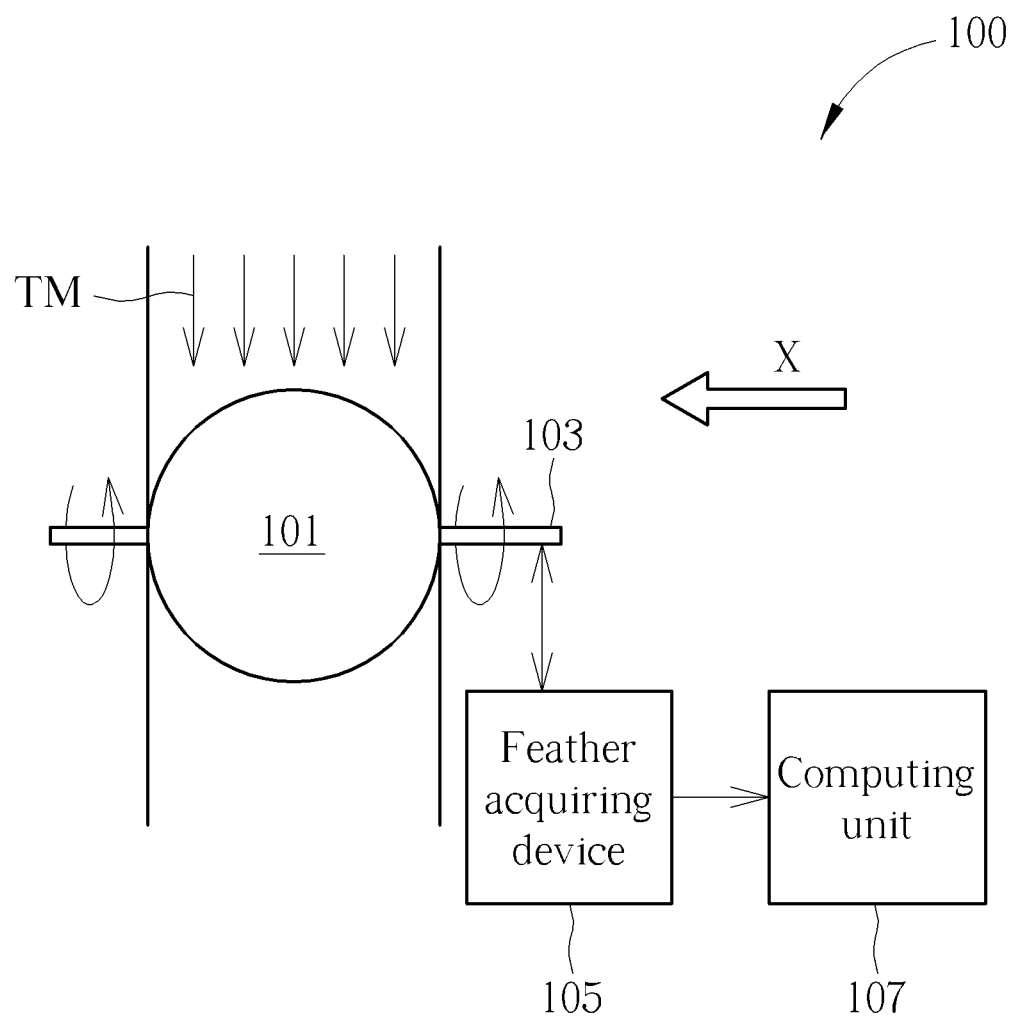
FIG. 1 and FIG. 2 are schematic diagrams illustrating a flow amount measuring apparatus according to one embodiment of the present invention.
Figure 2:
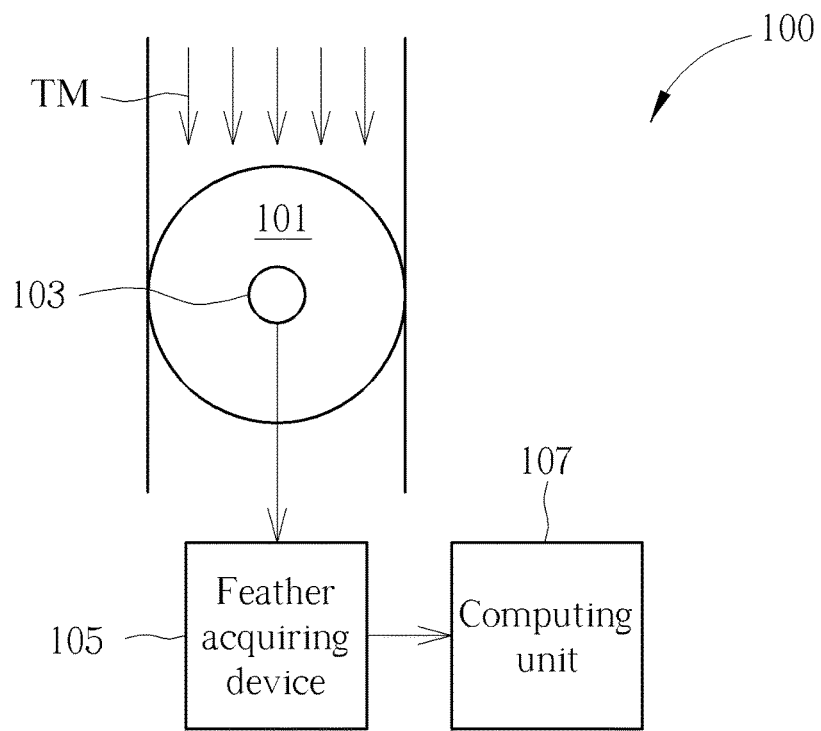

FIG. 1 and FIG. 2 are schematic diagrams illustrating a flow amount measuring apparatus according to one embodiment of the present invention. As illustrated in FIG. 1, the flow amount measuring apparatus 100 comprises a rotating device 101, a rotating bar 103, a feature acquiring device 105 and a computing unit 107. The rotating device 101 is configured to rotate while material TM flows through the rotating device 101. The rotating bar 103 is connected to the rotating device 101 and configured to rotate corresponding to rotating of the rotating device 101. For example, if the rotating device 101 has a full rotation (i.e. rotate for 360 degrees), the rotating bar 103 also correspondingly has a full rotation, but not limited.

The feature acquiring device 105 is configured to acquire at least one feature of the rotating bar 103. The computing unit 107 is configured to compute a number for full rotations for the rotating bar 103 based on the feature of the rotating bar 103, and configured to compute a flow amount for the material TM flows through the rotating device 101 based on the number for full rotations.

FIG. 1 and FIG. 2 illustrate the same flow amount measuring apparatus 100 but in different views. For more detail, FIG. 2 is a side view for FIG. 1 (i.e. following the X direction). As illustrated in FIG. 2, the rotating bar 103 is provided in the center of the rotating device 101, but not limited.

As above-mentioned, the rotating device 101 rotates while material TM flows through the rotating device 101, and the rotating bar 103 rotates corresponding to the rotating of the rotating device 101. Accordingly, if a number of full rotations for the rotating bar 103 can be acquired, a number of full rotations for the rotating device 101 can be accordingly acquired. By this way, the flow amount for the material TM flows through the rotating device can be computed. Details for computing a number for the rotation will be described later.

The material TM can be any kind of material having countable flow amount, for example, fluid, colloid, or powder. The feature acquiring device 105 can be any device that can acquire the feature of the rotating bar 103. The feature means anything can be recognized, in or on the rotating bar 103. For example, a texture, a mark, a crack or specific material in or on the rotating bar 103.

Figure 3:
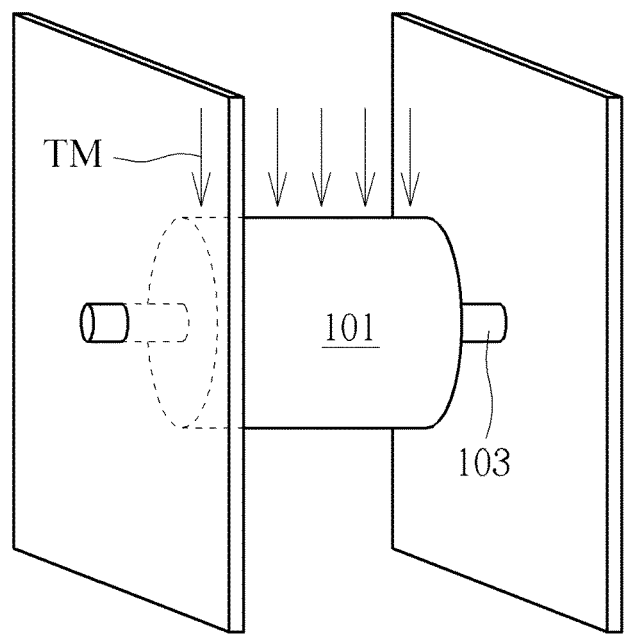
FIG. 3 is a schematic diagram illustrating a flow amount measuring apparatus according to another embodiment of the present invention.

Also, in the embodiments of FIG. 1 and FIG. 2, the rotating device 101 is spherical. However, the rotating device 101 can be in any other shape, for example, cylindrical as illustrated in FIG. 3.

In one embodiment, the feature is a mark and the feature acquiring device 105 is an image sensor for sensing an image comprising the feature of the rotating bar 105. The details are illustrated in FIG. 4-FIG. 7 of the present invention. Please note, FIG. 4 to FIG. 7 are diagrams illustrated in a view following the X direction in FIG. 1.

Figure 4:
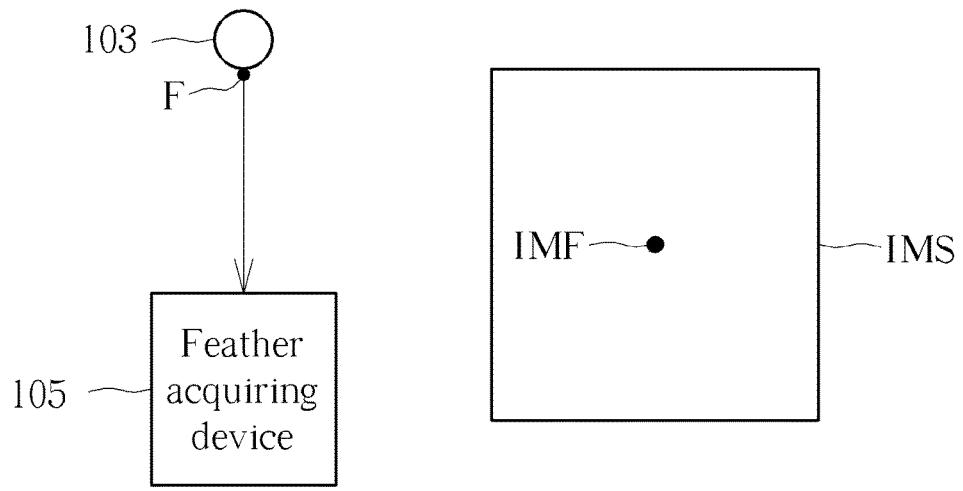
FIG. 4-FIG. 7 are schematic diagrams illustrating how to a flow amount that the material flows through the rotating device according to one embodiment of the present invention.

As illustrated in FIG. 4, the feature acquiring device 105 captures a sensing image IMS comprising a feature image IMF. Please note the sensing image IMS does not necessarily have a resolution as high as a resolution for an image captured by a powerful camera. The resolution or details of the sensing image IM can be set as low as possible, only if the feature F can be recognized. Please refer to FIG. 4, in the example of FIG. 4, the feature acquiring device 105 is under the rotating bar 103, thus the feature image IMF is at a center of the sensing image IMS.

Figure 5:
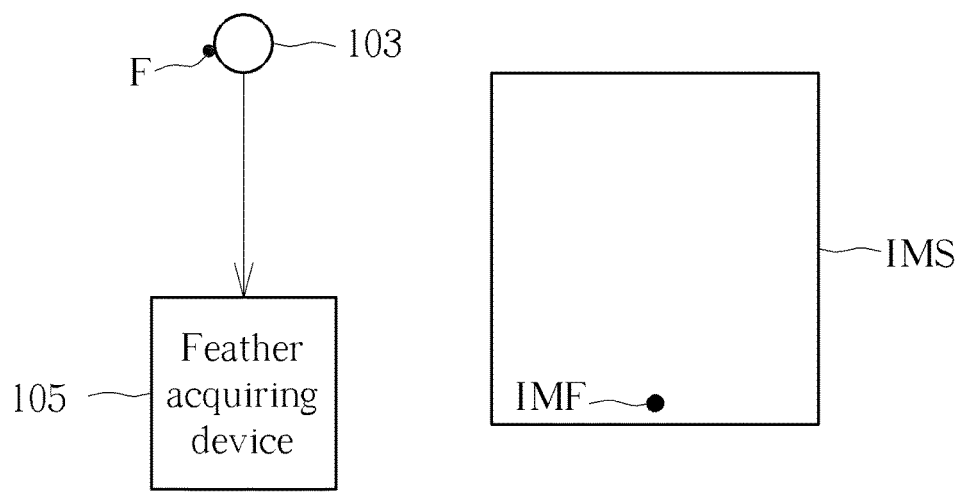
Figure 6:
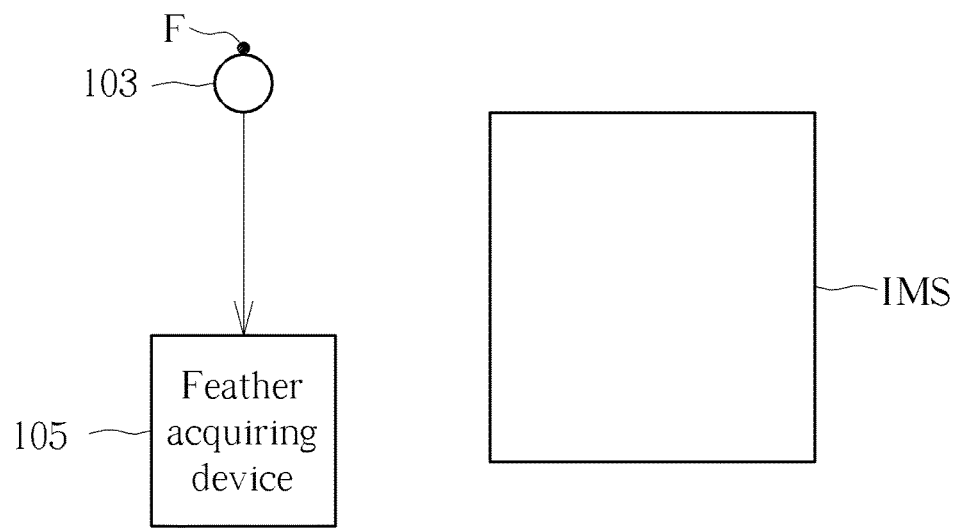
Figure 7:
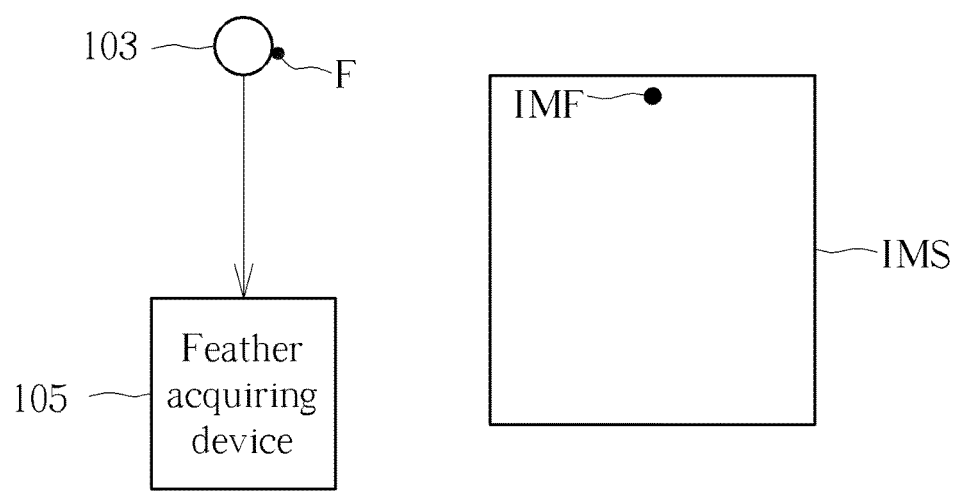

In FIG. 5, the rotating bar 103 rotates clockwise, thus the location for the feature F in the sensing image IMS moves. In FIG. 6, the rotating bar 103 continuously rotates clockwise, and the feature F moves to the top of the rotating bar 103. Accordingly, in FIG. 4 the feature image IMF does not appear in the sensing image IMS. In FIG. 7, the rotating bar 103 continuously rotates clockwise, and the feature F keeps moving, thus the feature image IMF correspondingly moves and appears again. Following FIG. 7, the feature F goes back to the location illustrated in FIG. 6, thus the feature image IMF moves the center of the sensing image IMS again, which means the rotating bar 103 has a full rotation. Accordingly, the computing unit 107 can compute a number for full rotations of the rotating bar 103 based on the feature M of the rotating bar 103.

In another embodiment, the feature F has predetermined material, and the feature acquiring device 105 comprises a laser device. The feature acquiring device 105 emits laser to the rotating bar 103 and can acquire a predetermined spectrum if the feature F is in the emitting range of the feature acquiring device 105. That is, the rotating bar 103 can be determined to rotate for a full rotation if the predetermined spectrum occurs two times.

Figure 8:
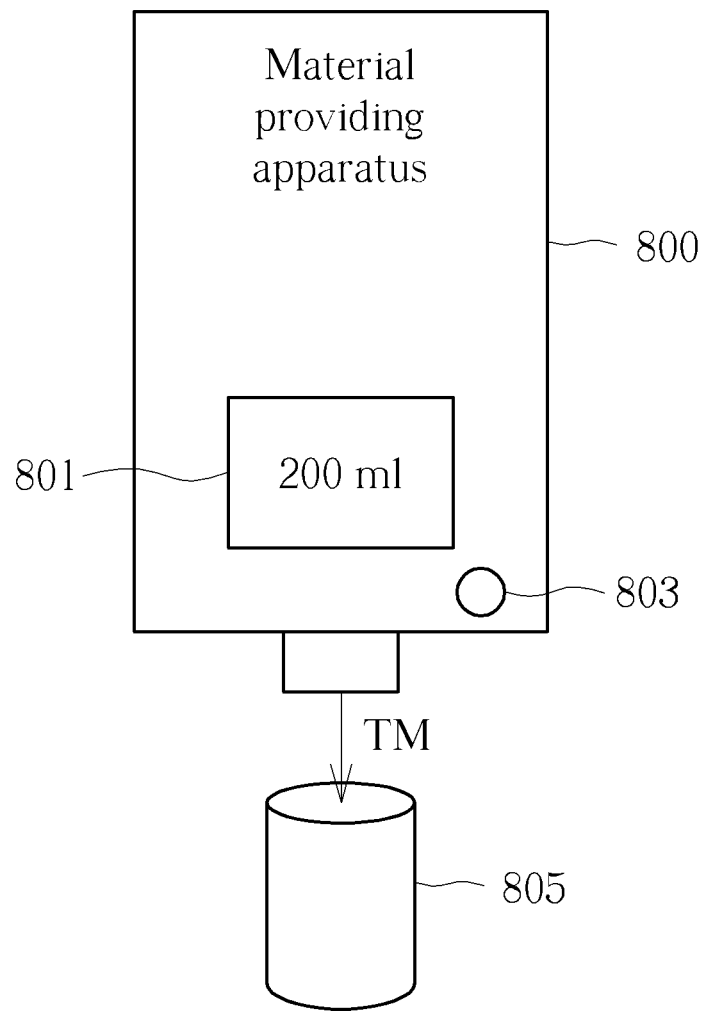
FIG. 8 is a schematic diagram illustrating a material providing apparatus according to one embodiment of the present invention.

FIG. 8 is a schematic diagram illustrating a material providing apparatus according to one embodiment of the present invention. The material providing apparatus 800 illustrated in FIG. 8 applies the flow amount measuring apparatus 100 illustrated in FIG. 1. A user can input a desired amount for the material via the input interface 801 (ex. a touch screen or a keypad). After the user presses the start button 803, the material providing apparatus 800 starts to provide material TM to the container 805. Also, the material providing apparatus 800 stops providing the material TM after the amount of the material TM provided by the material providing apparatus 800 reaches the a desired amount (in this example, 200 ml), which means the amount of the material TM flows through the flow amount measuring apparatus in the material providing apparatus 800 reaches the desired amount. Please note the user interface can be any type of user interface rather than the input interface 801 and the start button 803 illustrated in FIG. 8.

Figure 9:
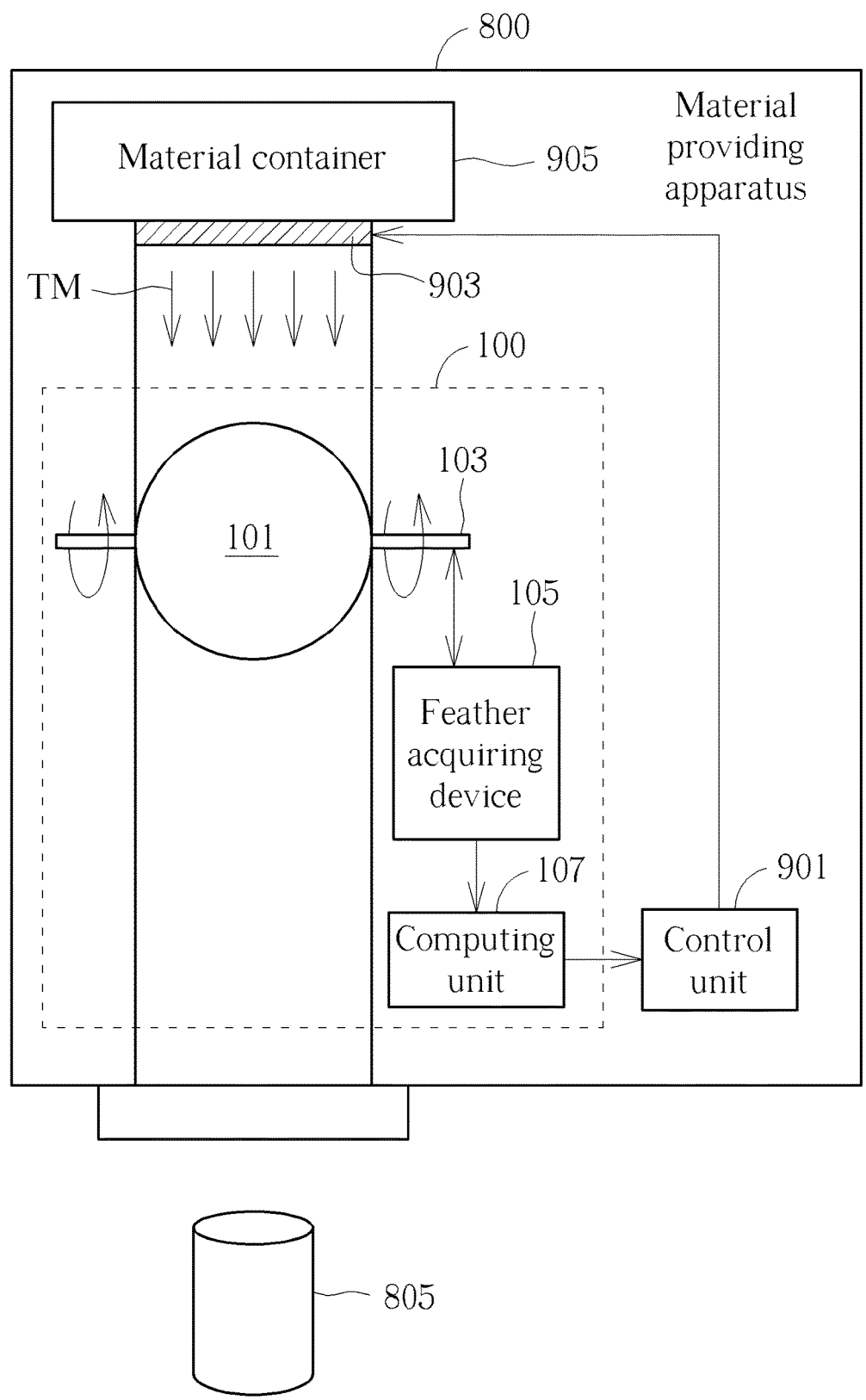
FIG. 9 is a schematic diagram illustrating a more detail structure for the material providing apparatus illustrated in FIG. 8.

FIG. 9 is a schematic diagram illustrating a more detail structure for the material providing apparatus illustrated in FIG. 8. As illustrated in FIG. 9, the material providing apparatus 800 comprises the flow amount measuring apparatus 100 illustrated in FIG. 1. Besides, the material providing apparatus 800 further comprises a control unit 901, a switch 903, and a material container 905. The material container 905 stores the material TM and is connected to the flow amount measuring apparatus 100 via the switch 903. The material TM can flow through the flow amount measuring apparatus 100 if the switch 903 is open. On the opposite, the material TM cannot flow through the flow amount measuring apparatus 100 if the switch 903 is closed. The control unit 901 controls the material TM to flow through the rotating device 101 or to stop flowing according to the flow amount for the material TM flowing through the flow amount measuring apparatus.

Please simultaneously refer to FIG. 8 and FIG. 9, if the user enters a desired amount via the input interface 801 and presses the start button 803, the control unit 901 controls the switch 903 in FIG. 9 to open, thus the material TM starts to flow through the flow amount measuring apparatus 100. After the flow amount for the material TM flowing through the flow amount measuring apparatus 100 reaches the desired amount. The control unit 901 controls the switch 903 to close. By this way, the material providing apparatus 800 can precisely provide the material TM for a desired amount.

Figure 10:
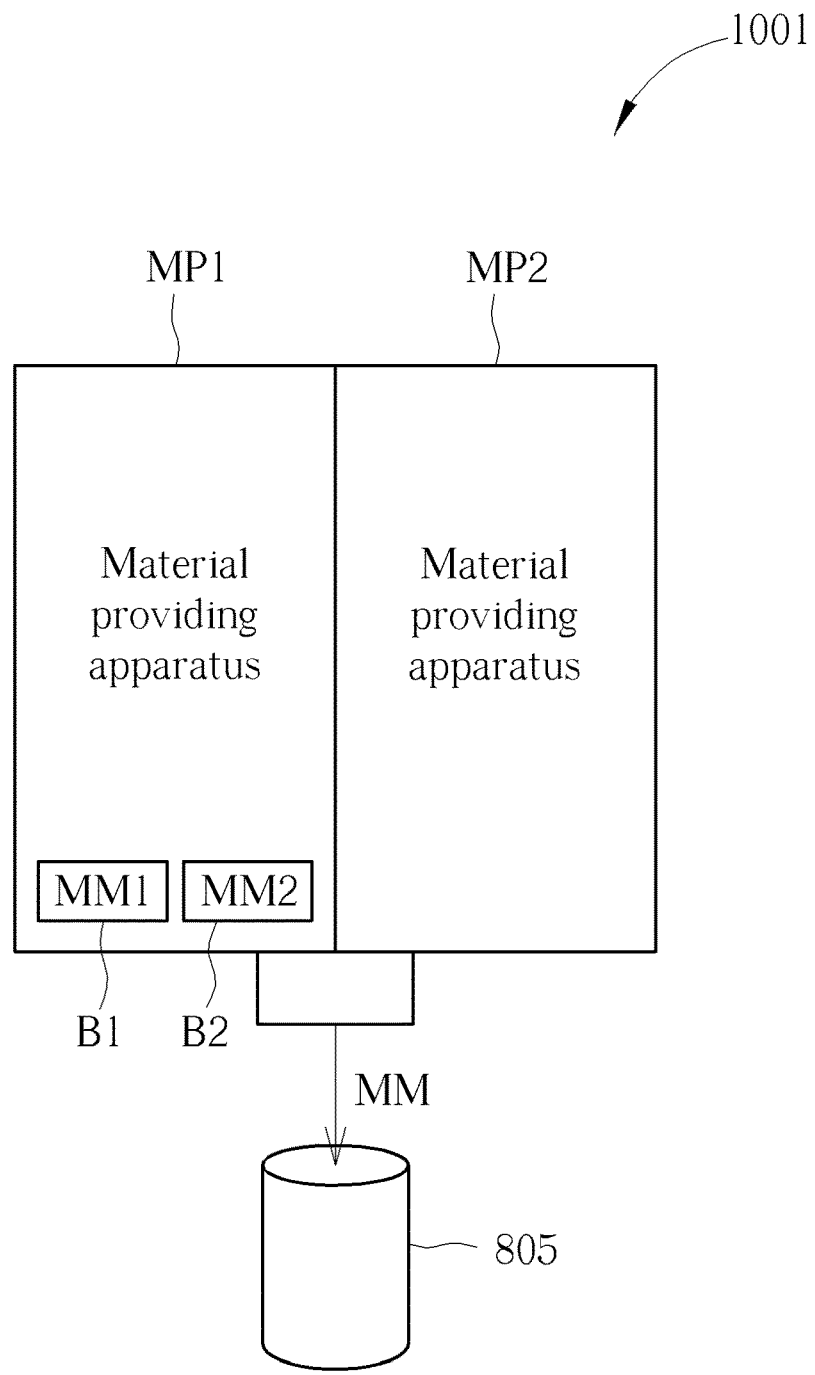
FIG. 10 is a schematic diagram illustrating a material mixing system according to one embodiment of the present invention.

FIG. 10 is a schematic diagram illustrating a material mixing system according to one embodiment of the present invention, which comprises more than one material providing apparatus. As illustrated in FIG. 10, the material mixing system 1001 comprises a first material providing apparatus MP1 and a second material providing apparatus MP2. The first material providing apparatus MP1 and a second material providing apparatus MP2 respectively comprises the structure illustrated in FIG. 9 and shares the same computing unit and the same control unit. The first material providing apparatus MP1 provides first material, and the second material providing apparatus MP2 provides second material. A user can input a desired mixing material to the material mixing system 1001, and then the first material providing apparatus MP1, second material providing apparatus MP2 operate corresponding to the desired mixing material.

For example, if the user presses the first mixing material button B1, the first material providing apparatus MP1 provides the first material for A ml and the second material providing apparatus MP2 provides the second material for B ml, to generate first mixing material. For another example, if the user presses the second mixing material button B2, the first material providing apparatus MP1 provides the first material for X ml and the second material providing apparatus MP2 provides the second material for Y ml, to generate second mixing material. The first material providing apparatus MP1 can accurately provide the first material for A ml or X ml based on above-mentioned embodiments. Also, the second material providing apparatus MP2 can accurately provide the second material for B ml or Y ml based on above-mentioned embodiments. Therefore, the mixing material MM can be easily and accurately acquired.

The operations for the first material providing apparatus MP1 and the second material providing apparatus MP2 can be understood based on above-mentioned embodiments, thus are omitted for brevity here.

Figure 11:
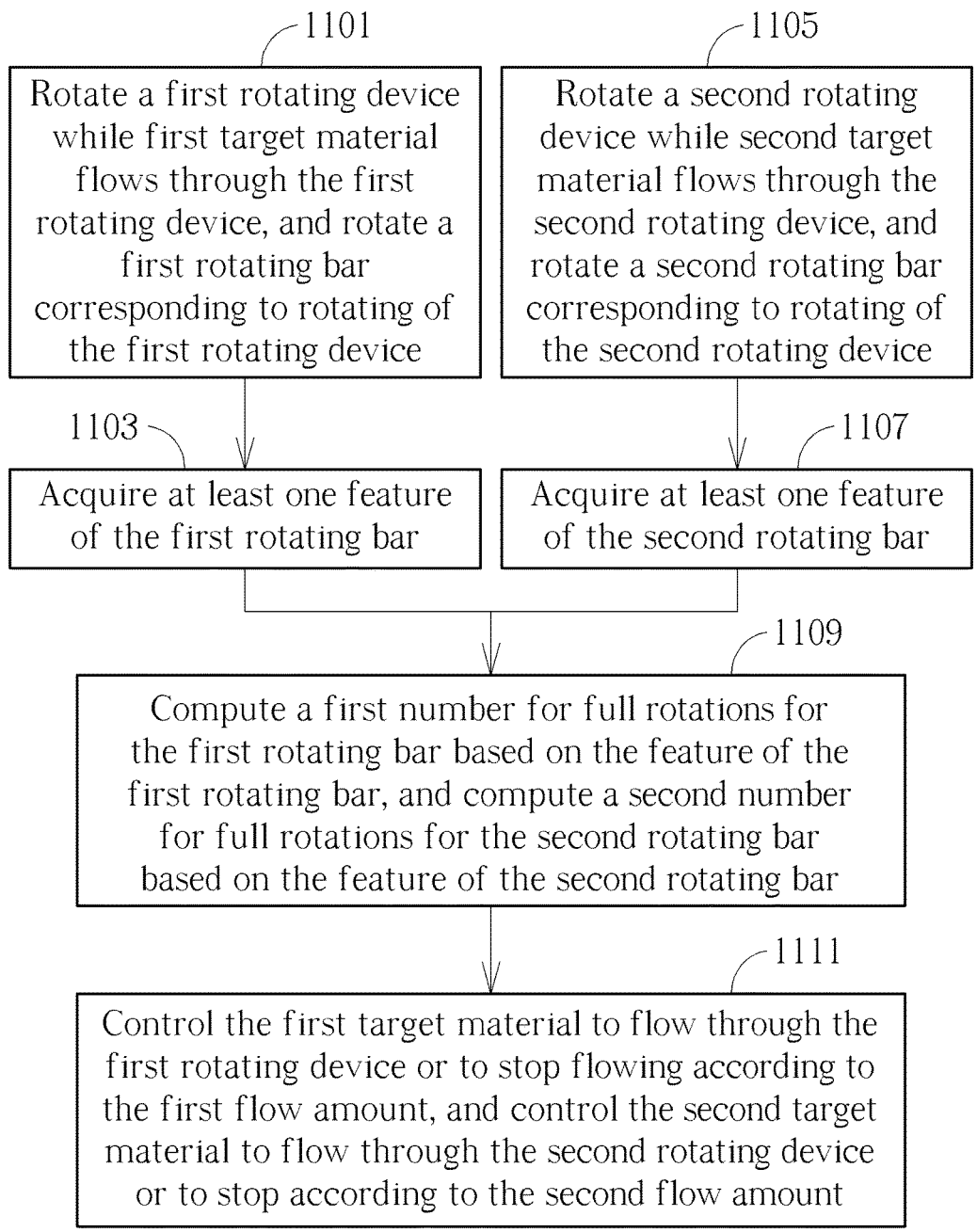
FIG. 11 is a flow chart illustrating a material mixing method according to one embodiment of the present invention.

In view of above-mentioned embodiments, a material mixing method illustrated in FIG. 11 can be acquired, which comprises following steps.

Step 1101

Rotate a first rotating device while first material flows through the first rotating device, and rotate a first rotating bar corresponding to rotating of the first rotating device. For example, the step 1101 is performed via the material providing apparatus MP1 in FIG. 10.

Step 1103

Acquire at least one feature of the first rotating bar.

Step 1105

Rotate a second rotating device while second material flows through the second rotating device, and rotate a second rotating bar corresponding to rotating of the second rotating device. For example, the step 1105 is performed via the material providing apparatus MP2 in FIG. 10.

Step 1107

Acquire at least one feature of the second rotating bar.

Step 1109

Compute a first number for full rotations for the first rotating bar based on the feature of the first rotating bar, and compute a second number for full rotations for the second rotating bar based on the feature of the second rotating bar. Also, compute first flow amount according to the first number, and compute second flow amount according to the second number.

Step 1111

Control the first material to flow through the first rotating device or to stop flowing according to the first flow amount, and control the second material to flow through the second rotating device or to stop flowing according to the second flow amount.

The material mixing method can be performed via executing at least one program stored in the non-transitory computer-readable medium, such as an optical disc or a hard disk.

In view of above-mentioned embodiments, the flow amount of material can be automatically and precisely measured, thus the user can easily acquire a desired amount of material. Additionally, the user can easily acquire desired mixing material since the flow amount for different material can be automatically and precisely measured.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flow amount measuring apparatus, comprising:
   a rotating device, configured to rotate while material flows through the rotating device;
   a rotating bar, connected to the rotating device, configured to rotate corresponding to rotating of the rotating device; a feature acquiring device, configured to detect at least one feature of the rotating bar;
   a computing unit, configured to compute a number for full rotations for the rotating bar based on the feature of the rotating bar, and configured to compute a flow amount for the material flows through the rotating device based on the number for full rotations;
   wherein the feature acquiring device is an image sensor for sensing an image comprising the feature of the rotating bar.

2. The flow amount measuring apparatus of claim 1, wherein the material is fluid.

3. The flow amount measuring apparatus of claim 1, wherein the material is colloid.

4. The flow amount measuring apparatus of claim 1, wherein the material is powder.

5. The flow amount measuring apparatus of claim 1, wherein the rotating device is spherical.

6. The flow amount measuring apparatus of claim 1, wherein the rotating device is cylindrical.

7. A material mixing system, comprising:
   a first material providing apparatus, comprising:
   a first rotating device, configured to rotate while first material flows through the first rotating device;
   a first rotating bar, connected to the first rotating device, configured to rotate corresponding to rotating of the first rotating device; and
   a first feature acquiring device, configured to acquire at least one feature of the first rotating bar;
   a second material providing apparatus, comprising:
   a second rotating device, configured to rotate while second material flows through the second rotating device;
   a second rotating bar, connected to the second rotating device, configured to rotate corresponding to rotating of the second rotating device; and
   a second feature acquiring device, configured to acquire at least one feature of the second rotating bar;
   a computing unit, configured to compute a first number for full rotations for the first rotating bar based on the feature of the first rotating bar, configured to compute a second number for full rotations for the second rotating bar based on the feature of the second rotating bar, configured to compute first flow amount according to the first number, and configured to compute second flow amount according to the second number; and
   a control unit, configured to control the first material to flow through the first rotating device or to stop based on the first flow amount, and configured to control the second material to flow through the second rotating device or to stop based on the second flow amount;
   wherein the first feature acquiring device is an image sensor for sensing an image comprising a feature image for the feature of the first rotating bar, and the second feature acquiring device is an image sensor for sensing an image comprising a feature image for the feature of the second rotating bar.

8. The material mixing system of claim 7, wherein if the first flow amount does not reach a first desired amount, the control unit controls the first material to flow through the first rotating device, wherein if the first flow amount reaches the first desired amount, the control unit controls the first material to stop flowing.

9. The material mixing system of claim 7, wherein the material is fluid.

10. The material mixing system of claim 7, wherein the material is colloid.

11. The material mixing system of claim 7, wherein the material is powder.

12. The material mixing system of claim 7, wherein the rotating device is spherical.

13. The material mixing system of claim 7, wherein the rotating device is cylindrical.

14. A non-transitory computer-readable medium storing at least one program, a material mixing method is performed while the program is executed, the material mixing method comprising:
   (a) rotating a first rotating device while first material flows through the first rotating device;
   (b) rotating a first rotating bar corresponding to rotating of the first rotating device;
   (c) acquiring at least one feature of the first rotating bar via sensing an image comprising a feature image for the feature of the first rotating bar;
   (d) rotating a second rotating device while second material flows through the second rotating device;
   (e) rotating a second rotating bar corresponding to rotating of the second rotating device;
   (f) acquiring at least one feature of the second rotating bar via sensing an image comprising a feature image for the feature of the second rotating bar;
   (g) computing a first number for full rotations for the first rotating bar based on the feature of the first rotating bar, computing a second number for full rotations for the second rotating bar based on the feature of the second rotating bar, computing first flow amount according to the first number, and configured to compute second flow amount according to the second number; and
   (h) controlling the first material to flow through the first rotating device or to stop flowing according to the first flow amount, and controlling the second material to flow through the second rotating device or to stop according to the second flow amount.

15. The non-transitory computer-readable medium of claim 14, wherein the step (h) comprises:
   if the first flow amount does not reach a first desired amount, controlling the first material to flow through the first rotating device, wherein if the first flow amount reaches the first desired amount, controlling the first material to stop flowing.

16. The non-transitory computer-readable medium of claim 14, wherein the material is fluid.

17. The non-transitory computer-readable medium of claim 14, wherein the material is colloid.

18. The non-transitory computer-readable medium of claim 14, wherein the material is powder.

* * * * *